(12) United States Patent
Thenthiruperai et al.

(10) Patent No.: US 7,801,534 B2
(45) Date of Patent: Sep. 21, 2010

(54) METHOD AND SYSTEM FOR CONVEYING LOCATION-GRANULARITY PREFERENCES WITH LOCATION-BASED SERVICE REQUESTS

(75) Inventors: Balaji S. Thenthiruperai, Overland Park, KS (US); Robert Howard Miller, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1603 days.

(21) Appl. No.: 10/734,700

(22) Filed: Dec. 11, 2003

(65) Prior Publication Data
US 2005/0136895 A1 Jun. 23, 2005

(51) Int. Cl.
*H04Q 7/20* (2006.01)
(52) U.S. Cl. .................. 455/456.1; 455/466; 455/412.2
(58) Field of Classification Search .............. 455/412.2, 455/412.1, 414.1, 414.2, 414.3, 456.1–456.6, 455/466, 419
See application file for complete search history.

(56) References Cited

U.S. PATENT DOCUMENTS

| | | | |
|---|---|---|---|
| 6,196,846 B1 * | 3/2001 | Berger et al. ................ 434/118 |
| 6,466,796 B1 * | 10/2002 | Jacobson et al. ......... 455/456.3 |
| 6,799,032 B2 * | 9/2004 | McDonnell et al. ......... 455/410 |
| 6,816,735 B1 * | 11/2004 | Rayburn et al. .......... 455/456.4 |
| 7,031,447 B2 * | 4/2006 | Mani ..................... 379/201.06 |
| 7,623,849 B2 * | 11/2009 | Zellner ...................... 455/415 |
| 2002/0037750 A1 * | 3/2002 | Hussain et al. .............. 455/564 |
| 2002/0101963 A1 * | 8/2002 | Contractor ............... 379/88.25 |
| 2002/0126701 A1 * | 9/2002 | Requena ..................... 370/469 |
| 2002/0173317 A1 * | 11/2002 | Nykanen et al. ............ 455/456 |
| 2002/0173318 A1 * | 11/2002 | Dyer .......................... 455/456 |
| 2003/0016804 A1 * | 1/2003 | Sheha et al. ........... 379/201.06 |
| 2003/0023726 A1 * | 1/2003 | Rice et al. .................... 709/225 |
| 2003/0045310 A1 * | 3/2003 | Price .......................... 455/466 |
| 2003/0119522 A1 * | 6/2003 | Barclay et al. .............. 455/456 |
| 2004/0116128 A1 * | 6/2004 | Chen ....................... 455/456.1 |

(Continued)

FOREIGN PATENT DOCUMENTS

EP 1176840 * 1/2002

(Continued)

OTHER PUBLICATIONS

International Search Report. International Search Report did not Find.

(Continued)

*Primary Examiner*—George Eng
*Assistant Examiner*—Khawar Iqbal

(57) ABSTRACT

A method and system for conveying location-granularity preferences with location-based service requests. A client station will detect a request to initiate a voice call, and before actually initiating the call the client station will send a message into a network indicating how to carry out a location-based service. In this manner, each time the client station accesses a location-based service, the client station will automatically send the instruction message to the service provider directing the provider how to carry out the service. Upon receiving the instructions, the location-based service provider may proceed to determine the location of the client station. The location-based service provider may then adjust the location of the client station according to the instructions. The service provider could then return the location of the client station, adjusted according to the instructions, directly to a location-based application, to provide the requested location-based service to the client station.

19 Claims, 5 Drawing Sheets

U.S. PATENT DOCUMENTS

| | | | |
|---|---|---|---|
| 2004/0202301 A1* | 10/2004 | Elliott | 379/201.02 |
| 2004/0203923 A1* | 10/2004 | Mullen | 455/456.1 |
| 2004/0203924 A1* | 10/2004 | Chen | 455/456.1 |
| 2004/0224702 A1* | 11/2004 | Chaskar | 455/456.3 |
| 2005/0049785 A1* | 3/2005 | Vergin | 701/209 |
| 2006/0190591 A1* | 8/2006 | Bobde et al. | 709/224 |

OTHER PUBLICATIONS

J. Cuellar, J.B. Morris, D. Mulligan, J. Peterson, J. Polk, "Geoprov requirements" Draft: *draft-ietf-geopriv-reqs-03.text,* p. 1-27, Mar. 2003.

A. Bhaduri, "Overview of IETF Geo Privacy Internet Draft," http://www.spatial.maine.edu/~anuket/research/geopriv.doc, Aug. 2003.

E. Snekkenes, "Concepts of Personal Location Privacy Policies," http://www2.hig.no/~einars/einar-publications/papers/ACM_ECOI_13_09_2001.pdf, Aug. 2003.

J. Lin, R. Laddaga, H. Naito, "Personal Location Agent for Communicating Entities (PLACE)," www.ai.mit.edu/projector/iroom/publications/mobilechi02.pdf, Aug. 2003.

U. Hengartner, P. Steenkiste, "Protecting Access to People Location Information," http://www.cs.cmuedu/People/uhengart/spc03.pdf, Aug. 2003.

* cited by examiner

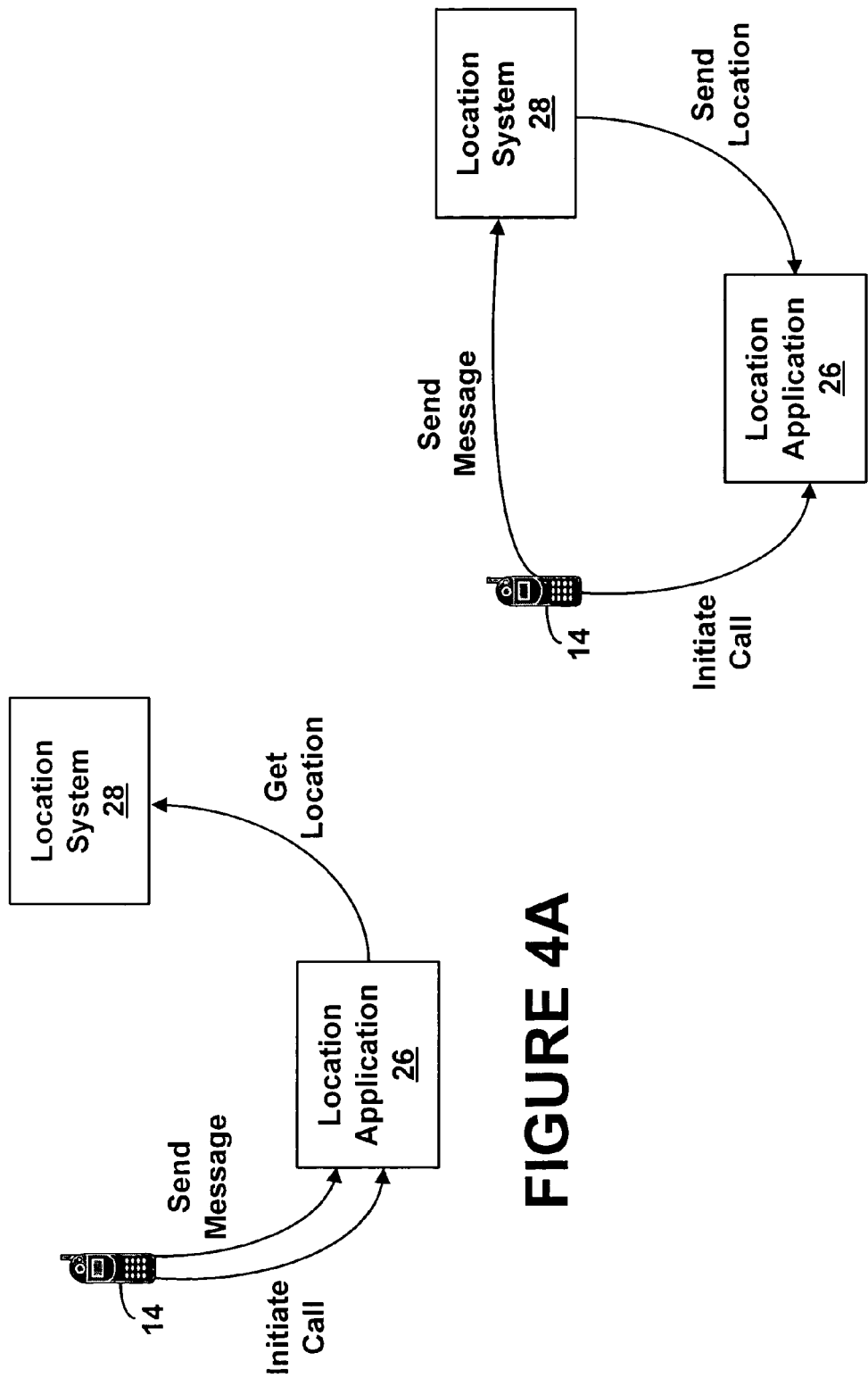

METHOD AND SYSTEM FOR CONVEYING LOCATION-GRANULARITY PREFERENCES WITH LOCATION-BASED SERVICE REQUESTS

FIELD OF INVENTION

The present invention relates to wireless communications, and more particularly, to conveying location-granularity preferences within requests for location-based services.

BACKGROUND

Wireless communication networks are increasingly using wireless location technologies to determine the locations of mobile stations they serve. As a result, there is an increasing interest in developing location-based services and applications, i.e., applications that make use of mobile station location information. These location-based applications may simply track or monitor the locations of mobile stations, or they may provide information or services to mobile stations based on their locations. Such location-based applications may be internal to the wireless communication network, or they may be third-party applications that obtain the locations of mobile stations from a location server or other entity in the wireless communication network. The Location Inter-operability Forum (LIF) has developed the "Mobile Location Protocol Specification" (version 3.0.0 published on Jun. 6, 2002), which defines one access method that allows applications to obtain mobile station location information from a wireless network.

However, location of a mobile station (and client stations in general) is a sensitive piece of information, and releasing it to random entities might pose security and privacy risks. The ability for a user to find others at any time is a powerful utility, but the ability for others to find the user at any time may be a rather uncomfortable notion for the user. People may not want to be stalked by strangers, suffocated by friends and family, or always locatable by business associates, for example.

Many users may fear total surveillance. At times people may not want to be located, or may want to restrict the accuracy at which they can be located. Thus, it may be desirable to provide location privacy options for a user.

SUMMARY

In an exemplary embodiment, a mechanism providing location privacy options for a user is presented. The mechanism may take the form of a method including, within a client station, detecting a request to initiate a voice call, and responsive to the request, sending from the client station into a network a message indicating how to carry out a location-based service.

In particular, the message may direct the network to determine (or not determine) a location of the client station. In addition, the message may indicate a location determination consent level of a user of the client station. The message can be sent from the client station into the network via a short message service (SMS) protocol or a hypertext transfer protocol (HTTP), for example.

In another embodiment, the method may include receiving a request from a user to place a voice call to a given directory number, and recognizing that the given directory number is associated with a particular destination party. The method may further include, responsive to the request and before initiating the voice call to the given directory number, sending to the particular destination party a message indicating a location granularity preference of the user.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described with reference to the drawings, in which:

FIGS. 4A-4C illustrate examples of signaling within a portion of the arrangement shown in FIG. 1 to convey location granularity preferences from a client station to a location-based service provider.

DETAILED DESCRIPTION OF EXEMPLARY EMBODIMENTS

In accordance with an exemplary embodiment of the present invention, a client station will detect a request to initiate a voice call, and before actually initiating the call the client station will send a message into a network indicating how to carry out a location-based service. Preferably, the client station recognizes that the voice call is directed to a location-based service provider, and before sending an origination message to initiate the voice call, the client station sends the instruction message to the service provider. In this manner, each time the client station accesses a location-based service, the client station will automatically send the instruction message to the service provider directing the provider how to carry out the service.

The message preferably directs the service provider to limit to a certain level the accuracy the client station's location information that is provided to carry out the service. For example, the message may indicate a "location determination consent level" of a user of the client station in the form of user location granularity preferences. The message may also indicate to the service provider whether or not the user allows the service provider to carry out the location-based service.

Upon receiving the preferences, the location-based service provider may proceed to determine the location of the client station using any known techniques, such as triangularization or using GPS information. The location-based service provider may then adjust the location of the client station according to the preferences. The service provider could then return the location of the client station, adjusted according to the preferences, directly to a location-based server running a location-based application, to provide the requested location-based service to the client station.

Wireless Network Architecture

Figure 1:
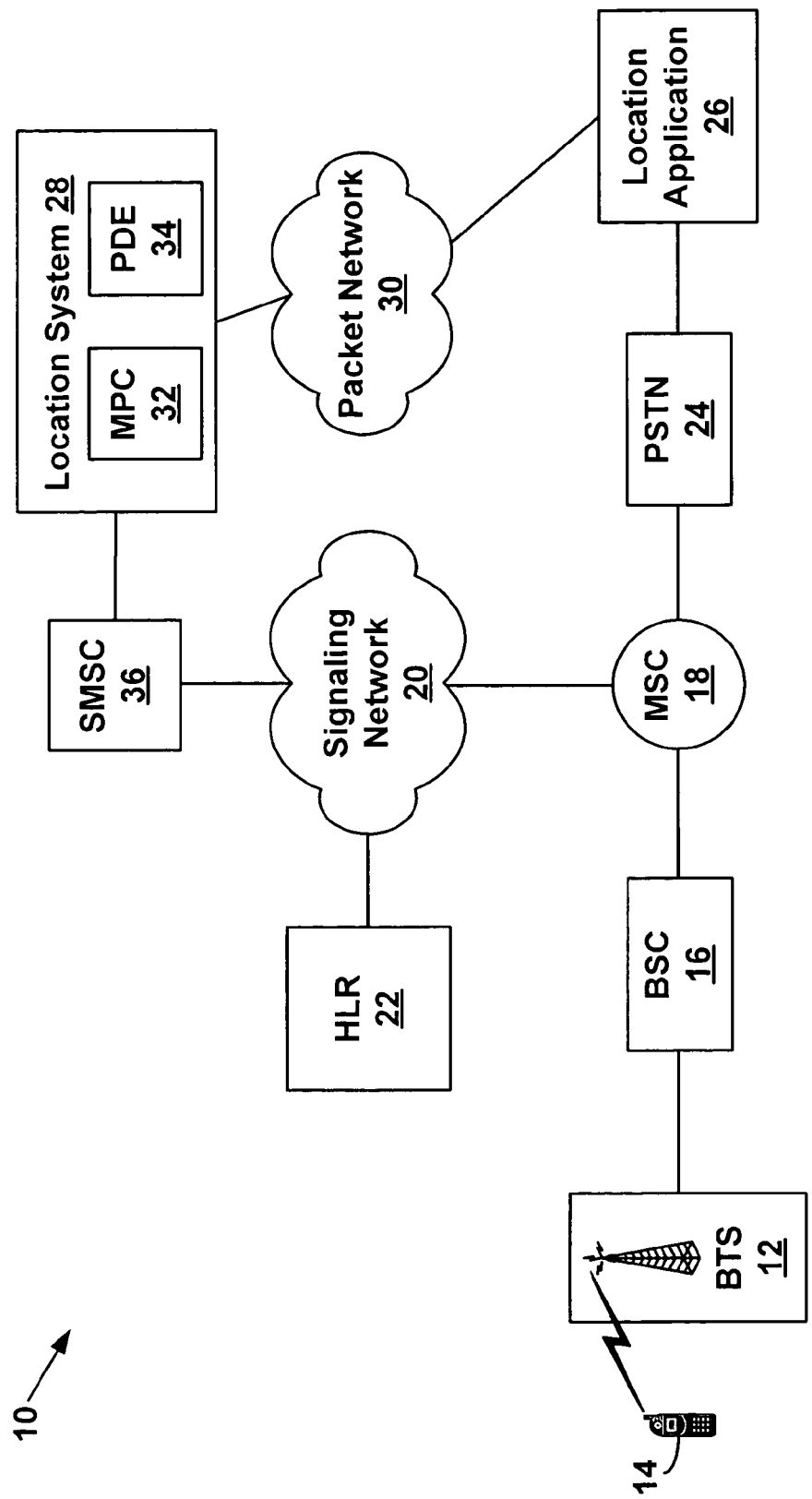
FIG. 1 is a block diagram illustrating one embodiment of a wireless communication network.

Referring now to the figures, FIG. 1 is a block diagram illustrating one embodiment of a wireless communication network 10. It should be understood that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location.

Still further, any of these or other entities that are described herein as carrying out a particular function could include a processor and data storage holding an appropriate set of program instructions (e.g., machine language instructions) executable by the processor to carry out that function. Still further, it should be understood that some or all of the entities shown on the network 10 could instead be on discrete networks or arranged in other locations.

The network 10 includes a base transceiver station (BTS) 12 that provides a wireless coverage area within which the BTS 12 may communicate with one or more client stations, such as mobile station 14, over an air interface. The client station can take any of a variety of forms. Examples of suitable stations include cellular or PCS telephones, PC cards or data terminals (e.g., wireless web devices such as the RIM Blackberry or the Palm VII™ personal digital assistant), wireless local area network stations (e.g., stations that are compliant with industry standard 802.11b), and satellite communication terminals. Other examples are possible as well.

The communications between the BTS 12 and the mobile station 14 may occur in a digital format, such as code division multiple access (CDMA), time division multiple access (TDMA), global standard for mobile communications (GSM), or 802.11x, or they may occur in an analog format, such as advanced mobile phone system (AMPS). One exemplary wireless communications format is "CDMA 2000," such as described in EIA/TIA/IS-2000 Series, Rev. A (published March 2000), which is fully incorporated herein by reference.

The BTS 12 is controlled by a base station controller (BSC) 16, which, in turn, communicates with a mobile switching center (MSC) 18. The BSC 16 may be responsible for controlling power levels and frequency allocation for the air interface between the BTS 12 and the mobile station 14.

The MSC 18 is connected to a signaling network 20, which may be associated with a circuit switched network, and the MSC 18 can then use an out-of-band signaling system, such as Signaling System 7 (SS7) in the signaling network 20 to route calls through the circuit switched network. Alternatively, the signaling network may be a packet switched network, such as the Internet, which routes packets using a network protocol.

The MSC 18 is able to signal through the signaling network 20 to a home location register (HLR) 22, which defines services and features authorized for use by particular mobile subscribers. The signaling between the MSC 18 and the HLR 22 may occur via one or more signal transfer points (STPs). The signaling between the MSC 18 and the HLR 22 may conform to the ANSI-41 specifications, published by the Telecommunication Industry Association, which are fully incorporated herein by reference.

The MSC 18, BSC 16 and BTS 12 may connect calls originating from calling parties using mobile stations, or other communication devices, to the mobile station 14. Similarly, the MSC 18, BSC 16, and BTS 12 may connect calls originating from the mobile station 14 to their destinations.

The MSC 18 also connects to a public switched telephone network (PSTN) 24, which provides connections to other network elements and other service providers. For example, the network 10 may also carry communications related to determining and reporting locations of client stations, such as mobile station 14. In this regard, the wireless communication network 10 may carry communications for location-based service providers. A location-based service provider may have various entities residing in the network 10 to perform location-based services. For example, as shown in FIG. 1, a location-based service provider may have a location application 26 and a location system 28 residing in the network 10. The location system 28 and the location application 26 may communicate via a packet network 30, and the location application 26 may communicate with client stations through the PSTN 24.

In the exemplary embodiment, the location system 28 functions to determine and/or report the location of mobile stations. As such, the location system 28 could take a variety of forms. For example, the location system 28 could comprise a mobile positioning center (MPC) 32 and a position determining entity (PDE) 34 as defined by TIA/EIA/J-STD-036-A (Telecommunications Industry Association/Electronics Industry Alliance), entitled "Enhanced Wireless 911, Phase 2," which is fully incorporated herein by reference.

The MPC 32 can generally be a database application executed on a service control point and can function to store locations of a mobile station. The PDE 34, in turn, can be any system for determining the location of mobile stations. As an example, the PDE 34 might be a network-based location-determination system, such as an HLR that maintains a record of the cell and/or sector in which each mobile station is currently operating, or a triangularization system that determines where a mobile station is located based on a comparison of relative signal strength from several measuring points. Alternatively or additionally, the PDE 34 might be a handset-based (or, more generally, subscriber based) position determining system, such as a GPS receiver in a mobile station. In that event, a mechanism would preferably be provided to facilitate communication of location information between the handset and other network entities. Such a mechanism is defined by the specification "Position Determination Service Standard for Dual Mode Spread Spectrum Systems," TIA/EIA/IS-801, published in October 1999 and revised in February 2001 and fully incorporated herein by reference, which defines a set of signaling messages between the mobile station and the BTS/BSC/MSC to provide a position determination service.

In the exemplary embodiment, the MPC 32 would then collect the location of each mobile station, as determined by the PDE 34. In turn, one or more other entities on the network 10 could query the MPC 32 to determine the location of a given mobile station, and the MPC 32 can report the requested location. In one embodiment, the location reported by the MPC 32 could be an indication of which area or zone the mobile station is located in at the moment (or, equivalently, as last determined). In this regard, the location itself might be the zone (such as if the location is a cell and/or sector for instance). Or the MPC 32 or other entity (e.g., the querying entity) could translate the location information into a zone.

Alternatively, an entity on network 10 could query the MPC 32, the HLR 22, or a VLR (visitor location register) to obtain a list of all mobile stations that are located in a given zone (such as all mobile stations in a particular cell/sector). The entity can then query that list to determine if a given mobile station is located in that zone.

The network 10 may also have a number of location applications corresponding to location-based service providers, such as location application 26, residing on or within the network 10, such as on the packet network 30. The location applications may communicate with the location system 28 to obtain a location of a client station, such as mobile station 14, in order to provide a location-based service to the client station. As one example, a location application may be a directory assistance center, which identifies restaurants and/ or stores in a particular area for users of a client station based on the location of the client station.

The network 10 may also provide messaging services, such as the Short Message Service (SMS), which allows for the exchange of short text messages between a client station and the network 10, and between the network 10 and a client station capable of transmitting and optionally receiving short messages. Short message entry features are provided through interfaces to the client stations. Senders use these interfaces to enter short messages, intended destination addresses, and various delivery options. SMS is defined by industry standard IS-637A (promulgated by the Telecommunications Industry Association (TIA)/Electronics Industry Association (EIA)), which is herein entirely incorporated by reference.

The mobile station 14 therefore may send an SMS message through the signaling network 20 to a short message service center (SMSC) 36, which can route the message accordingly. In one instance, the SMSC 36 may route the message to the location system 28. The SMSC 36 represents a generic SMS Message Center function. The SMSC 36 may be included in, or co-located with, the BTS 12, MSC 18, or signaling network 20.

Similarly, the location system 28 could send an SMS message to mobile station 14 via the signaling network 20 and SMSC 36. By querying the HLR 22, the SMSC 36 would determine which MSC is currently serving the mobile station 14 and then forward the SMS message through the signaling network 20 to that MSC, e.g., MSC 18. The MSC 18 will then send the SMS message via the BSC 16 and the BTS 12 to the mobile station 14. The mobile station 14 will then alert a user of the new message and may display the message as text to the user.

The network 10 may also provide messaging services using other protocols, such as the Session Initiation Protocol (SIP), for instance. SIP is described in Internet Engineering Task Force Request For Comments 2543 (IETF RFC 2543) and IETF RFC 3261, both of which are fully incorporated herein by reference. The network 10 may include SIP entities (not shown), such as SIP proxy agents, to route SIP messages through the network 10. Further, the network 10 may provide message services via the Hypertext Transfer Protocol (HTTP). HTTP is described in IETF RFC 2616, the contents of which are fully incorporated herein by reference. Other examples are possible as well.

Conveying Location-Granularity Preference Instructions with Location-Based Service Requests In accordance with the exemplary embodiment, the mobile station 14 may send a message through the network's messaging services (e.g., using SMS) to entities that reside on the signaling network 20 or packet network 30 in order to provide instructions for carrying out a particular service. For example, the mobile station 14 may send an SMS message to the location system 28 to indicate how to carry out a location-based service.

Figure 2:
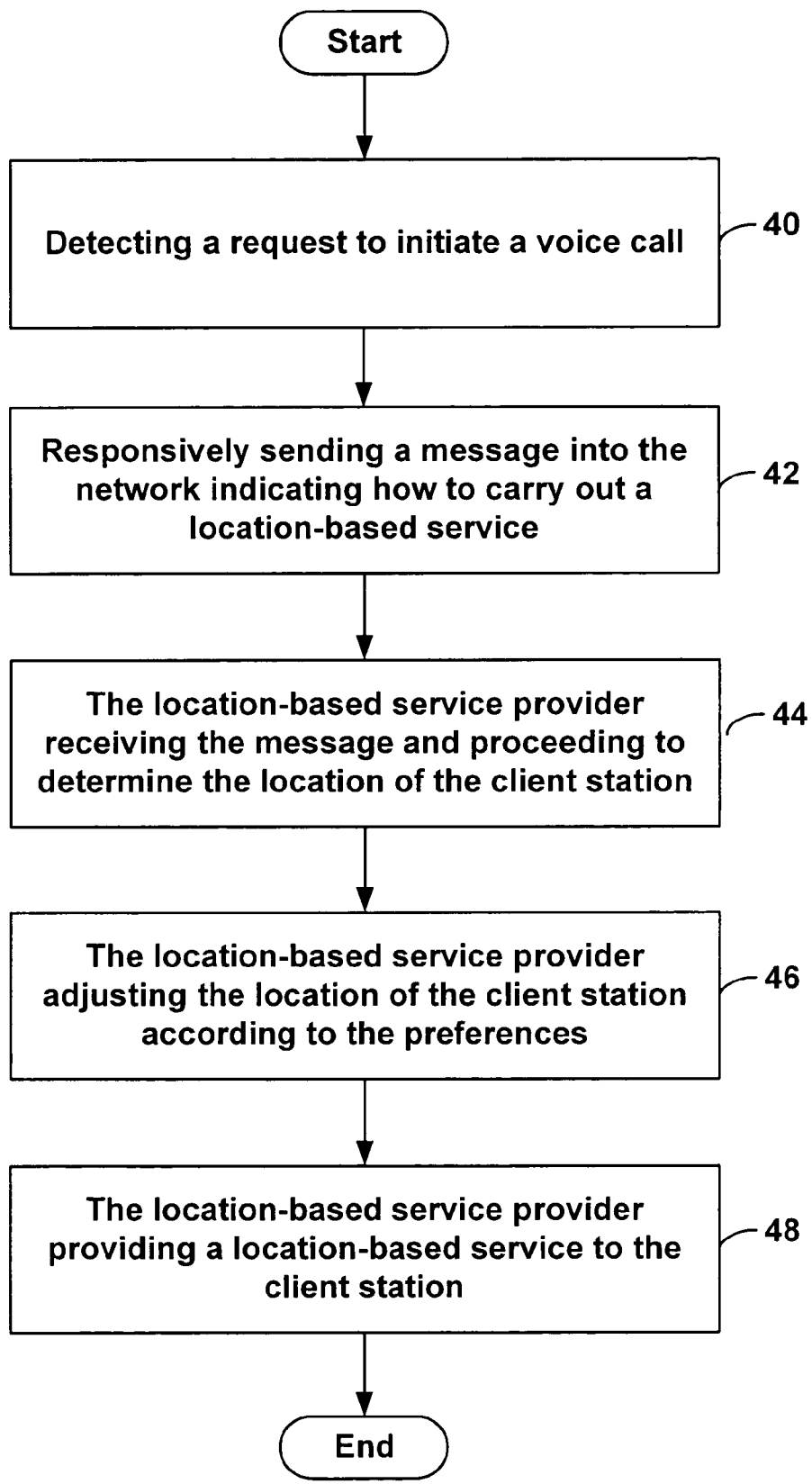
FIG. 2 is a flowchart depicting one embodiment of a set of functions that could be employed within the arrangement shown in FIG. 1.

Referring now to FIG. 2, a flow chart is provided to illustrate one embodiment of a set of functions that could be employed within the arrangement shown in FIG. 1. As shown in FIG. 2, a client station will detect a request to initiate a voice call that preferably is directed to a location based-application, as shown at block 40, and before actually initiating the call the client station will responsively send a message into a network indicating how to carry out a location-based service, as shown at block 42. For example, the client station may send the message to entities that reside on the signaling network 20 or packet network 30, such as the location system 28 or the location application 26.

As shown at block 44, the location-based service provider will receive (either at the location system 28 or the location application 26) the message and proceed to determine the location of the client station using any known techniques, such as triangularization or using GPS information. Once the service provider determines the location, the location-based service provider will then adjust the location of the client station according to the instructions in the message (e.g., preferences), as shown at block 46. The service provider will then provide a location-based service to the client station using the adjusted location, as shown at block 48.

The message that the client station sends into the network preferably directs the service provider to limit to a certain level the accuracy of the client station's location information that is provided to a location-based application. For example, the message may indicate a "location determination consent level" of a user of the client station, which may indicate the user's comfort level in allowing the network to determine his/her location, in the form of user location granularity preferences. The preferences could indicate a level of accuracy of the client station's location that the user desires to allow an application to receive.

The message may also indicate to the service provider whether or not the user allows the service provider to carry out the location-based service. Thus, the message may direct the service provider to determine the location of the client station, or may explicitly direct the service provider to not determine the location of the client station.

The user may set his/her own preferences. The preferences may be set in a general manner so as to apply to all location-based service providers, or preferences may be set specifically for each individual location-based service provider.

Figure 3:
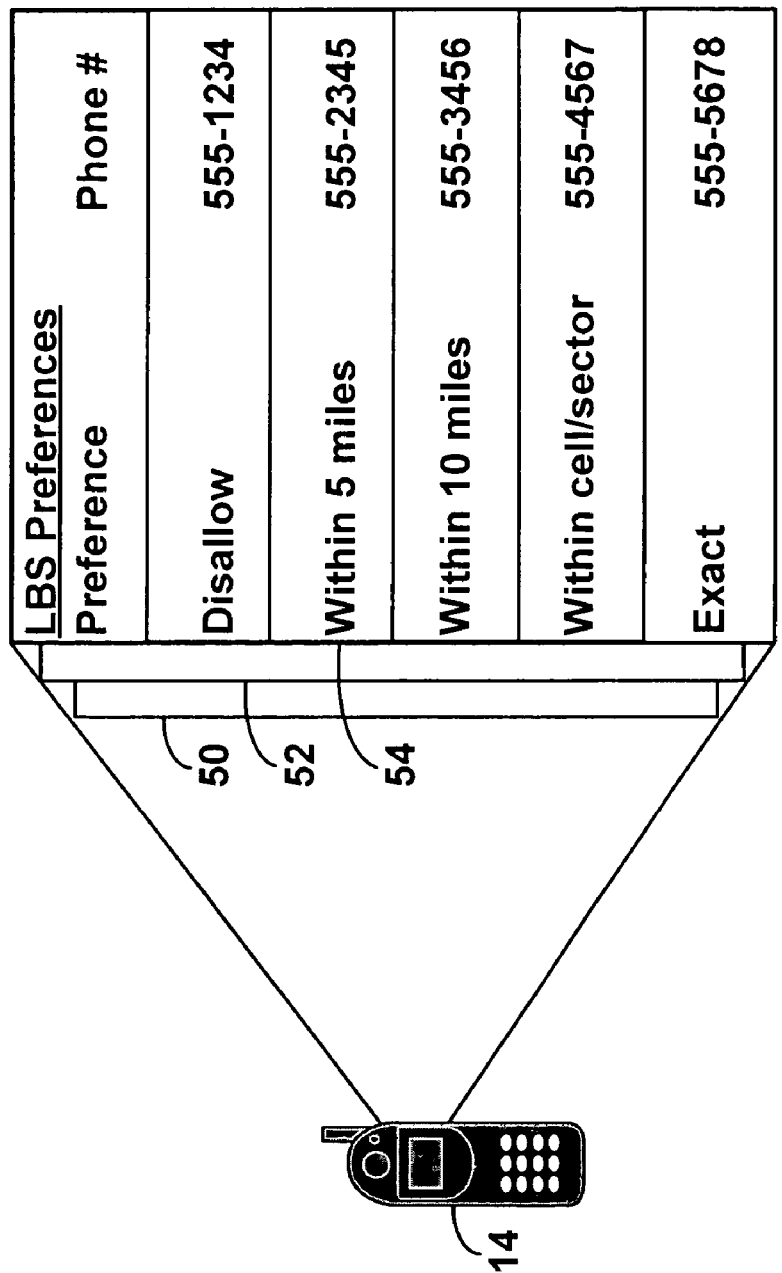
FIG. 3 illustrates one example of a set of location-based services (LBS) preferences, which are stored on a client station.

In addition, the user may store the user's location-based services preferences on the user's client station. The client station may also allow the user to modify the preferences on the client station using any conventional graphical user interface. FIG. 3 illustrates one example of a set of location-based services (LBS) preferences, which are stored on a client station, such as mobile station 14. The LBS preferences may be stored in a database within data storage of the mobile station 14. Multiple sets of LBS preferences can be stored, such as preferences 50, 52, and 54. Example LBS preferences include those shown on preference 54.

A user may set certain preferences for specified telephone numbers, which may correspond to specific location-based services. A user may feel more comfortable allowing her/his location to be determined more exactly by some services. Example location-granularity preferences shown include disallowing a location to be determined, allowing the location of the client station to be determined within five miles or within ten miles, allowing the location of the client station to be determined within a range of an operating wireless cell or sector area, or allowing the location of the client station to be determined as exact as possible. In the LBS preferences shown in FIG. 3, the user desires the location application corresponding to the telephone number 555-5678 to receive the user's exact location upon execution of the application, while the location application corresponding to telephone number 555-3456 will only receive a location that is within ten miles of the user's exact location upon execution.

Detecting a Request to Initiate a Voice Call

In the exemplary embodiment, the client station sends a message upon detecting a request to initiate a voice call that indicates how to carry out a location-based service. In general, the client station may detect a request to initiate a voice call by recognizing that a voice call origination message should be sent into the network. For example, the client station may detect a request to initiate a voice call by recognizing that an "Origination Message," as described in TIA/EIA/IS-2000.4-A-1, should be sent into the network regardless of a mechanism that triggered the sending of the Origination Message.

As a specific example, the client station may send the message upon receiving a set of dialed digits. The client station may receive the set of dialed digits once the user enters a telephone number and presses "SEND" on the client station, for example. The client station may recognize that the set of dialed digits corresponds to a location-based service or application. For example, the client station may compare the received dialed digits to telephone numbers stored within the LBS preferences (as shown in FIG. 3).

In another embodiment, if the client station can recognize voice commands, the client station can detect a request to initiate a voice call upon receiving a spoken instruction to initiate a call from a user of the client station. For example, many cellular telephones provide voice activated dialing services where a user speaks an instruction (e.g., "Call Directory Services") recognized by the phone as a request to initiate a voice call. The phone may then recognize that the requested voice call corresponds to a location-based service or application.

Sending an Instruction Message

Figure 4C:
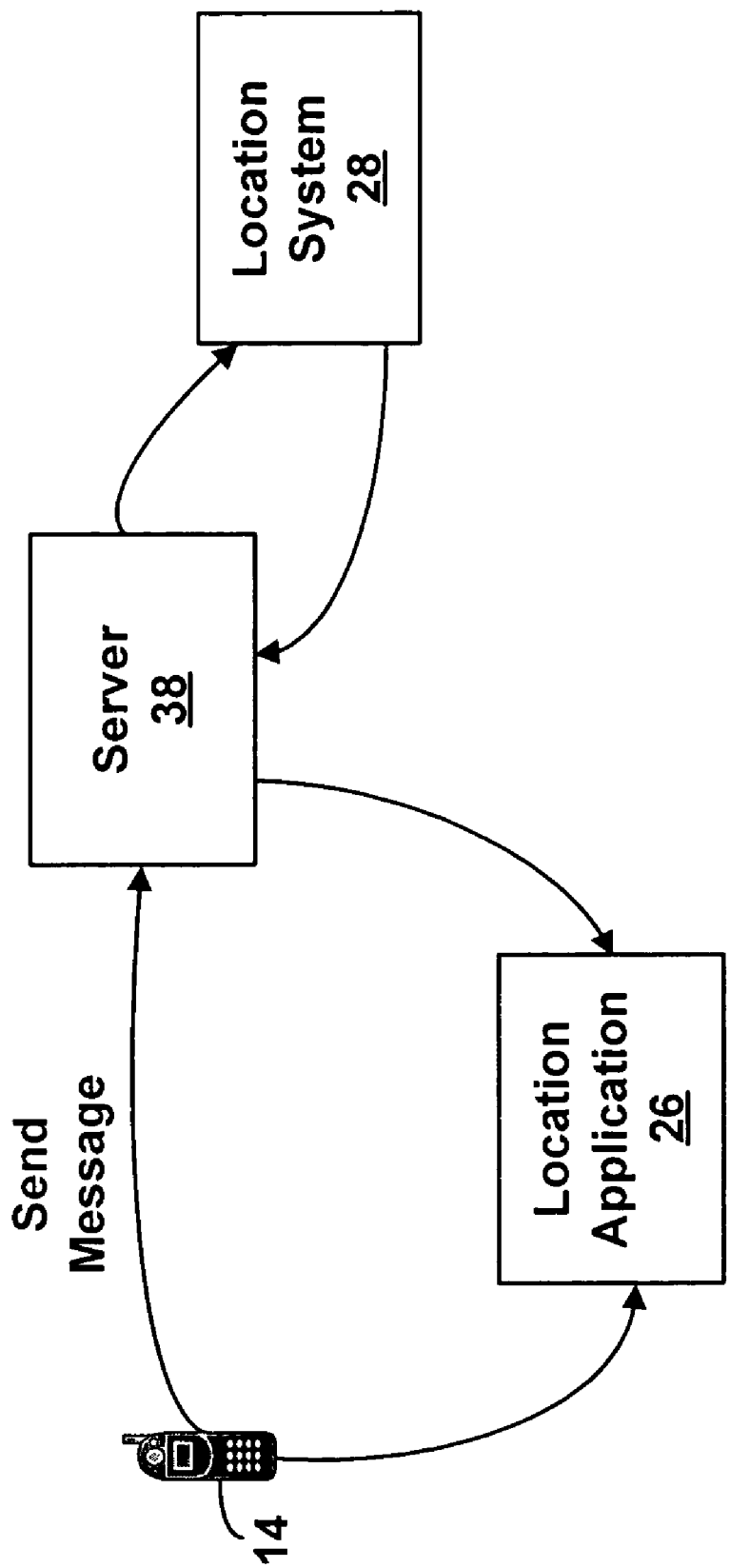

FIGS. 4A, 4B, and 4C illustrate a portion of the arrangement shown in FIG. 1, and examples of signaling within this portion to convey location granularity preferences from a client station to a location-based service provider. In one embodiment, upon detection of a request to initiate a voice call, the mobile station 14 may be programmed to send a message including the user's location granularity preferences to the location application 26, which corresponds to the dialed telephone number, as shown in FIG. 4A. After sending the message, the mobile station 14 will then initiate a voice call to the dialed telephone number in a conventional manner, in order to contact the location application 26. The location application 26 will query the location system 28 through the packet network 30 after receiving the preferences message to determine the location of the mobile station 14 (described below). In turn, the location system 28 will send the location of the mobile station 14 to the location application 26, which can then adjust the location according to the user's preferences that were included in the preferences message.

In another embodiment, upon detection of a request to initiate a voice call, the mobile station 14 may be programmed to send a message including the user's location granularity preferences to the location system 28, and then subsequently initiate a voice call to a dialed telephone number (which may correspond to the location application 26, as shown in FIG. 4B). The location system 28 may receive the message from the mobile station 14, determine the mobile station's location, and then adjust the location according to the preferences.

After adjusting the location according to the preferences, the location system 28 could send the adjusted location to the location application 26. As one example, after detecting the request to initiate the voice call to a location application, the client station may place an identifier within the granularity preferences message that identifies the location application 26 as an entity desiring the location of the client station. Thus, after adjusting the location of the client station, the location system 28 may then send this adjusted location to the location application 26 that is identified in the preferences message.

In still another embodiment, upon detection of a request to initiate a call, the mobile station 14 may be programmed to send a message to a central server 38, as shown in FIG. 4C, and then subsequently initiate a voice call to a dialed telephone number (which may correspond to the location application 26. The server 38 may reside on the packet network 30, which is illustrated in FIG. 1. The server 38 may include a database containing the user's location granularity preferences, and upon receiving the message, the server 38 could retrieve the user's preferences using an identifier that is included in the message. Alternatively, the message may include the preferences. The server 38 would then contact the location system 28 to determine the mobile station's location and then adjust the location in accordance with the preferences. The server 38 may then send the adjusted location to the location application 26, using an identifier within the request message from the mobile station 14 in order to send the adjusted location to the appropriate application. In this embodiment, the server 38 may perform as a central database for the user to store his/her preferences. The user may then also be able to update preferences within the database using the mobile station 14.

Thus, as illustrated in FIGS. 4A, 4B, and 4C, the detection of a voice call may trigger sending the user's LBS preferences to either the location system 28, to the location application 26 that corresponds to the voice call, or to a centralized server 38. For example, if the message includes an identifier indicating the location application 26, then the message may be sent to the location system 28, which can determine the location and send it to the location application 28. If the message does not include an identifier, then the message may be sent to the location application 26, which will proceed to determine the location of the client station.

The client station may send the message indicating the user's preferences within an SMS message. Thus, the client station could send an SMS message including the preferences via an SMSC, which would then either send the message to the location system 28, the location application 26, or the server 38. The SMS message may be an SMS Point-to-Point message, as defined in IS-637A, sent from a mobile station to a BTS and subsequently through a signaling network to an SMSC. The SMS message may include any of the following parameters: teleservice identifier, service category, originating address, originating subaddress, destination address, destination subaddress, bearer reply option, and bearer data. The preferences may thus be indicated as bearer data, and the service category could indicate that the SMS message includes location granularity preferences.

The client station could also send the information indicating the user's preferences within an SIP message or an HTTP message, for example. Other examples are possible as well.

A location granularity message may include one or more preferences. For example, if dialed digits match a telephone number stored in the LBS preferences, the client station could send a message indicating the corresponding LBS preference before initiating a call to the dialed telephone number. For instance, if the dialed telephone number was 555-3456, then the mobile station 14 would send a message to the location system 28 directing the location system 28 to determine the mobile station's location within ten miles of its exact location, using the preferences shown in FIG. 3. In this manner, the client station identifies the dialed telephone number as a location-based service by comparing the telephone number with those stored in the LBS preferences, and then retrieves the preference(s) corresponding to the dialed telephone number to send these preferences to the location-based service provider. Alternatively, after identifying the dialed telephone number as a location-based service, the client station may simply send all LBS preferences stored on the client station to the location-based service provider, and the location-based service provider could then determine the proper preferences to use based upon a corresponding location-based service identifier, for example.

As another example, if the phone can receive voice commands, the phone may receive spoken instructions from a user. The phone may then retrieve a telephone number associated with the voice command, compare the telephone number to telephone numbers stored within the LBS preferences (as shown in FIG. 3), and determine whether a location-based service is requested. Then, if the telephone number matches one stored in the LBS preferences, before initiating a call to the telephone number, the phone could send a message indicating the corresponding LBS preference(s).

Determining the Location of the Client Station

Upon receiving the message including the user's LBS preferences, the location-based service provider may then proceed to determine the client station's location. The location-based service provider may determine the location of the client station according to signaling described in J-STD-036-A.

In one embodiment, the location system 28 determines the mobile station's location by acquiring a GPS reading of the mobile station's current location, which can include an indication of latitude and longitude. In this regard, the mobile station 14 may include a GPS receiver, and may autonomously determine its location. The mobile station 14 may send to a PDE its calculated location, e.g., its latitude, longitude and altitude. The mobile station 14 may relay this information to the PDE either upon initiation of a call, termination of a call, or periodically to update the PDE's knowledge of the location of the mobile station 14. In addition, the mobile station 14 may relay this information to the PDE in response to a specific request for this information. For example, a PDE in the location system 28 may signal the mobile station 14, through an MPC and the MSC 18, requesting the mobile station's location and the mobile station 14 may respond by sending a position determination response message to the MSC 18, which relays this information through an Short Message Delivery Point To Point (SMDPP) message to the PDE, for example.

In another embodiment, wireless assisted GPS is used to determine the location of the mobile station 14. In the wireless assisted GPS approach, the mobile station 14 includes a GPS receiver but does not determine its location on its own. Instead, an MPC or PDE, determines the location of mobile station 14, in terms of latitude, longitude and altitude, based at least in part on information provided by the mobile station 14. For example, the mobile station 14 may first send its approximate location, such as the cell or sector of a BTS it is operating in, to the PDE. Using this approximate location, the PDE determines what GPS satellites are in view of the cell or sector and their Doppler offsets and then sends this information to the mobile station 14 as "assistance data." The mobile station 14 then uses this assistance data to acquire GPS signals from the GPS satellites and, thereby, obtains information, such as pseudoranges, from which its location may be calculated. The mobile station 14 sends the pseudoranges and/or other location-related information to the PDE. The PDE then calculates the location of the mobile station 14, such as in terms of latitude, longitude and altitude, based on the information from the mobile station 14 and, optionally, various corrections.

However, other techniques for determining the location of the mobile station 14 may be used. For example, location technologies that do not rely on GPS may be used to determine the location of the mobile station 14, such as by performing a time/frequency analysis on incoming signals received at the BTS 12. Further, the location system 28 may signal the HLR 22 that maintains a record of the cell and sector in which the mobile station 14 is currently operating to determine a cell/sector location of the mobile station 14.

The technique in which the location system 28 uses to determine the location of the mobile station 14 may depend on the LBS preferences of the user of the mobile station 14. For instance, if the LBS preferences indicate that the user wants the location within about 10 miles of the user's exact location, then the location-based service provider may possibly use sector level location techniques, such as querying the HLR 22 to request a location of the client station, since the HLR 22 keeps track of the sector in which the mobile station 14 is operating. As another example, the preferences may indicate that the user desires an exact location, and the location-based service provider may then use GPS techniques to determine the mobile station's location.

Adjusting the Location According to the Preferences

Once the location system 28 receives the location of the client station, the location system 28 can then adjust the location according to the preferences. Alternatively, once the location application 26 receives the location of the client station, the location application 26 can adjust the location according to the preferences. In still another embodiment, after the server 38 receives the location, the server 38 may adjust the location according to the preferences.

As an example, a user may specify that the user wants all location requests to return the location of the client station within a five mile area of its exact location. Upon receiving the preferences, the location-based service provider may proceed to determine the location of the client station using any known techniques, such as triangularization or using GPS information. The location-based service provider may then adjust the location of the client station according to the preferences. For example, the location-based service provider may generalize the location of the client station by calculating a zone where the client station is positioned, e.g., a circular area created by extending outward from the exact location by five miles in all directions. The service provider may then select a location within the zone to generalize the client station's location. As other examples, the location-based service provider may generalize the location of the client station by simply using a location that is ten miles North of the client station's location, or by using the cell/sector in which the client station is operating as a general location of the client station.

As another example, a location of a mobile station may be adjusted in a more randomized fashion. For instance, after receiving the location of a client station, the location based service provider may adjust the location by randomly selecting a location that is within 5 miles of the client station's location by simply generating a location that is 5 miles from the client station in any direction. In this manner, the location is adjusted in any direction to provide more anonymity to the user.

Still further, a location could be adjusted by returning a point of interest or a general area as the location of the mobile station. For instance, if the mobile station is located at a location within a suburb of a city, the suburb could be returned as the location of the mobile station to indicate a general area of where the mobile station is actually located. Or, a specific landmark or other point of interest could be returned as the mobile station's location to indicate a general area as well. Other examples are possible as well.

The manner in which the location is adjusted is indicated by the user's preferences. If a user does not have any preferences, default settings could be used and set for each application. In this manner, the service provider may restrict the accuracy at which a user of a client station can be located. Rather than providing the exact location of the client station, and thus the user of the client station if the user has the client station with her/him, the service provider provides a more generalized location to the location application.

Providing a Location-Based Service to the Client Station

While the location application 26 is in the process of obtaining the adjusted location of the client station (or after the adjusted location has been obtained), the client station will initiate the voice call to the requested location application. The client station may initiate the voice call at any time after sending the message including the LBS preferences to the location-based service provider. The location application 26 may obtain the adjusted location of the client station and proceed to provide the requested location-based service to the user through the voice call.

As one example, the user may have initiated a voice call to a directory services application to find a specific restaurant located close to the user's current location. After receiving the adjusted location of the user's client station, a directory assistance operator may then lookup restaurants located at or near the user's location and provide this information to the user through the voice call.

With the benefit of the exemplary embodiment, the user may save air time (and possibly money) by having the client station send the preferences before the voice call is started rather than the user having to inform a recipient of the voice call of the preferences. Moreover, the user can set his/her own preferences and can have the client station send them automatically. Further, the exemplary embodiment may increase a user's comfort level in allowing a location-based service provider to determine the user's location subject to the user's preferences.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A method comprising:
   in a client station, detecting a request to initiate a voice call;
   responsive to the request and before initiating the voice call, retrieving a location granularity preference of a user of the client station from memory of the client station and sending from the client station into a network a message indicating the location granularity preference of the user, wherein the memory of the client station includes a plurality of location granularity preferences and each location granularity preference corresponds to a respective location application; and
   after sending the message indicating the location granularity preference of the user into the network, sending an origination message to initiate the voice call.

2. The method of claim 1, wherein detecting the request to initiate the voice call comprises receiving a set of dialed digits from the user of the client station.

3. The method of claim 2, further comprising comparing the set of dialed digits to sets of dialed digits stored in a database of the client station.

4. The method of claim 3, further comprising recognizing that the set of dialed digits corresponds to a selected telephone number.

5. The method of claim 4, wherein sending the message from the client station into the network comprises sending the message from the client station to a location-based service provider associated with the selected telephone number.

6. The method of claim 1, wherein the message directs the network to determine a location of the client station.

7. The method of claim 1, wherein the message directs the network not to determine a location of the client station.

8. The method of claim 1, wherein the message indicates a location determination consent level of a user of the client station.

9. The method of claim 1, wherein the location granularity preference instructs the network to determine a location of the client station, and based on the location, to provide a randomly adjusted location of the client station to a location-based application that corresponds to the voice call.

10. The method of claim 1, further comprising receiving a location based service in response to the message from the network.

11. The method of claim 1, further comprising storing the location granularity preference on the client station.

12. The method of claim 11, further comprising the user modifying the location granularity preference on the client station.

13. The method of claim 1, further comprising receiving a response to the message from the network indicating a location of the client station.

14. The method of claim 1, wherein sending the message from the client station into the network comprises sending a short message service (SMS) message into the network.

15. The method of claim 1, wherein sending the message from the client station into the network comprises sending an HTTP message into the network.

16. The method of claim 1, wherein sending the message from the client station into the network comprises sending an SIP message into the network.

17. The method of claim 1, wherein sending from the client station into the network the message indicating how to carry out the location-based service comprises sending the message via a communication path comprising an air interface.

18. A client station comprising:
    a processor;
    data storage; and
    program logic stored in the data storage and executable by the processor, to: (i) detect a request to initiate a voice call, (ii) responsive to the request and before initiating the voice call, retrieve a location granularity preference of a user of the client station from memory of the client station and send into a network a message indicating the location granularity preference of the user, wherein the memory of the client station includes a plurality of location granularity preferences and each location granularity preference corresponds to a respective location application, (iii) and after sending the message indicating the location granularity preference of the user into the network, sending an origination message to initiate the voice call.

19. The client station of claim 18, wherein the client station is selected from the group consisting of a mobile station and a landline station.

* * * * *